United States Patent
Bird et al.

(10) Patent No.: US 7,614,486 B2
(45) Date of Patent: Nov. 10, 2009

(54) RETENTION OF AN ACTUATING SPRING IN A ONE-WAY CLUTCH OR BRAKE

(75) Inventors: Norman J. Bird, Plymouth, MI (US); Dennis N. Wys, Ann Arbor, MI (US); John W. Kimes, Wayne, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 471 days.

(21) Appl. No.: 11/600,372

(22) Filed: Nov. 16, 2006

(65) Prior Publication Data

US 2007/0062775 A1    Mar. 22, 2007

Related U.S. Application Data

(63) Continuation-in-part of application No. 11/077,387, filed on Mar. 10, 2005, now Pat. No. 7,383,930, which is a continuation-in-part of application No. 10/899,918, filed on Jul. 28, 2004, now Pat. No. 7,100,756.

(51) Int. Cl.
*F16D 41/12* (2006.01)
*F16F 1/26* (2006.01)

(52) U.S. Cl. .......................................... 192/46; 267/165

(58) Field of Classification Search ................... 267/165
See application file for complete search history.

(56) References Cited

U.S. PATENT DOCUMENTS

| | | | |
|---|---|---|---|
| 709,900 A | 9/1902 | Gurney et al. | |
| 1,883,966 A | 10/1932 | Krause | |
| 2,013,765 A | 9/1935 | Richardson | |
| 2,134,405 A | 10/1938 | Hulshizer | |
| 2,323,353 A | 7/1943 | Plog | |
| 2,710,504 A | 6/1955 | Dodge | |
| 3,197,001 A | 7/1965 | Clements | |
| 3,527,327 A | 9/1970 | McCreary | |
| 3,563,354 A | 2/1971 | Sigg | |
| 3,737,015 A * | 6/1973 | Johnson et al. | ................ 192/45 |
| 3,997,041 A | 12/1976 | Judd | |
| 4,363,390 A | 12/1982 | Eisend et al. | |
| 5,064,037 A | 11/1991 | Long, Jr. | |
| 5,070,978 A | 12/1991 | Pires | |
| 5,143,189 A | 9/1992 | Meier-Burkamp | |
| 5,540,456 A * | 7/1996 | Meier-Burkamp et al. | .. 280/236 |
| 5,853,073 A | 12/1998 | Costin | |
| 5,947,245 A | 9/1999 | Costin et al. | |
| 5,954,174 A | 9/1999 | Costin | |

(Continued)

FOREIGN PATENT DOCUMENTS

GB    2116    1/1907

*Primary Examiner*—Rodney H Bonck
(74) *Attorney, Agent, or Firm*—David B. Kelley; MacMillan, Sobanski & Todd, LLC

(57) ABSTRACT

A device for transmitting torque in one rotary direction includes a cam plate including notches spaced angularly about an axis, a rocker plate including pockets mutually spaced angularly about the axis, rockers, each rocker being located in a respective pocket for movement toward and away from engagement with a notch on the cam plate, a spring recesses, each spring recess including a retainer, and springs, each spring located in a spring recess and engaged with a retainer, for urging a rocker toward the cam plate and engagement with a notch.

12 Claims, 14 Drawing Sheets

U.S. PATENT DOCUMENTS

| | | |
|---|---|---|
| 5,971,122 A | 10/1999 | Costin et al. |
| 6,062,362 A | 5/2000 | Costin et al. |
| 6,109,410 A | 8/2000 | Costin |
| 6,202,813 B1 * | 3/2001 | Yahata et al. ............ 192/46 |
| 6,338,403 B1 * | 1/2002 | Costin et al. ............ 192/46 |
| 6,575,275 B2 | 6/2003 | Muramatsu et al. |
| 6,679,364 B2 | 1/2004 | Muramatsu et al. |
| 6,814,200 B2 * | 11/2004 | Stefina ............ 192/43.1 |
| 2002/0056602 A1 | 5/2002 | Aurora |
| 2002/0112933 A1 | 8/2002 | Yamamoto et al. |
| 2002/0148697 A1 | 10/2002 | Muramatsu et al. |
| 2003/0146063 A1 * | 8/2003 | Yamada et al. ............ 192/46 |

* cited by examiner

RETENTION OF AN ACTUATING SPRING IN A ONE-WAY CLUTCH OR BRAKE

CROSS-REFERENCE TO RELATED APPLICATION

This application is a continuation-in-part of the U.S. patent application Ser. No. 11/077,387, filed Mar. 10, 2005, now U.S. Pat. No. 7,383,930, which is a continuation-in-part of U.S. patent application Ser. No. 10/899,918, filed Jul. 28, 2004, now U.S. Pat. No. 7,100,756, issued Sep. 5, 2006.

BACKGROUND OF THE INVENTION

1. Field of the Invention

The invention relates in general to a clutch that produces a drive is connection between components when their relative rotation is in one direction, and overruns when relative rotation is in the opposite direction. In particular, the invention pertains to such clutches having rockers that engage or disengage at least partially due to the effect of centrifugal force acting on the rocker.

2. Description of the Prior Art

Conventional one-way clutches and brakes for producing a one-way drive connection between inner and outer races of the assembly include sprags or rollers for releasably driveably connecting the races and the components of a mechanical assembly connected to the races. One-way clutches and brakes perform satisfactorily in many cases, but certain applications, such as those in which a large magnitude of torque is transmitted by the component or those that provide only a small space for the component, require an unconventional sprag-type or roller-type clutch or brake to meet desire requirements.

Conventional one-way brakes and clutches have at least one sprag or roller, which driveably locks two notched or pocketed races together mutually in one rotary direction and allows the races to rotate freely in the other direction. Rocker and sprag type one-way brake assemblies can increase the torque capacity for a given package size compared to those of a roller-type brake, but they are generally limited in torque transmitting capacity by the magnitude of the contact or bearing stresses caused by contact of the rockers or sprags with the races.

To overcome these and other difficulties, a one-way overrunning clutch described in U.S. Pat. No. 5,070,978 includes a drive member and a driven member, which are mounted for clockwise and counterclockwise rotation about a common axis. The drive member includes a planar drive face, normal to the common axis, which connects with a source of power for rotating the planar drive face either clockwise or counterclockwise. The driven member includes a planar driven face, positioned in close proximity to and in confronting relationship with the drive face. The drive and driven members are coupled to one another through a series of pockets in one of the drive faces, and a plurality of cooperating struts carried by the other face, such that when the drive member is driven counterclockwise, it drives the driven member with it. When the drive member is driven clockwise, it does not drive the driven member, but rotates freely relative to the driven member. Column stability of the strut, which transmits the torsion load between the races, is an important factor in the design.

U.S. Pat. No. 5,954,174 discloses a ratchet one-way clutch assembly having an inner race with notches, an outer race with pockets, and rockers located in the pockets to engage the notches. The rockers have a pivot ridge which mates with a peak or recess in the pockets in the outer race to position the rocker in the pocket. The center of mass of each rocker is located such that the rocker tends to engage or disengage a notch in the inner race. A spring is used to provide a tilting force on each rocker directed to produce engagement of the rocker with a notch.

When centrifugally loaded, the springs in one-way clutches and brakes compress against the rockers. This increases stress on the spring, and increases the chance that the spring will be expelled from the pocket.

Conventional one-way brakes and clutches develop relatively large magnitudes of hoop stress in the races when torque is transmitted through the brake; therefore, the races of conventional one-way brakes are formed of bearing grade steel in order to withstand the operating hoop stress. Clutches formed of powdered metal potentially can be produced at relatively low cost compared to the cost to form and produce a conventional clutch or brake of high grade steel, provided extensive machining is avoided.

The clutches described in the U.S. Pat. Nos. 5,070,978 and 5,947,245, however, require a significant amount of machining of the components that are formed of powdered metal. Excessive internal backlash, which can produce noise at unacceptable levels, is a potential problem under certain operating conditions with these clutches.

Conventionally, the actuating spring might be retained by configuring the surrounding surfaces at the spring recess such that operating stress in the spring is lower than the strength of the spring and that the spring would not be expelled from the pocket. But these surfaces are formed so they perform multiple functions that influence performance of the rocker. Imposing an additional spring retention requirement would compromise their ability to perform the other functions and impair design flexibility. A need exists in a one-way clutch or brake to secure the springs that actuate the rockers in a spring recess, thereby preventing inadvertent escape of the spring from the recess while in service, while being transported and during handling.

SUMMARY OF THE INVENTION

A retainer located in the spring recess is engaged by the spring during its installation and secures the innermost leg of the spring to the rocker ring. When the ring and spring are loaded by centrifugal force due to high speed rotation, the retainer prevents the spring from collapsing against the rocker, thereby reducing stress in the spring. Furthermore, because the spring is positively retained in its recess, the chance that the spring can escape from the recess when the rocker pivots into engagement with the notched ring in the open condition is greatly reduced.

A rocker ring subassembly, which includes the rockers and actuating springs, prevents the springs from exiting the pockets by positively retaining each spring in its pocket. The rocker ring is formed of powder metal, which is very hard and abrasive. Due to the centrifugal force on the springs at high rotational speed, the springs deform within their recesses. The surfaces of the rocker ring in the vicinity of each spring recess are flared and radiused to prevent chafing and abrasion of the spring on these surfaces.

The shape of a pocket ring, which contains the rockers, uniquely requires no secondary machining operations for any purpose, such as to eliminate densifiers and de-densifiers in the powdered metal components. The components of the brake that are formed from powdered metal require no machining after they are formed.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
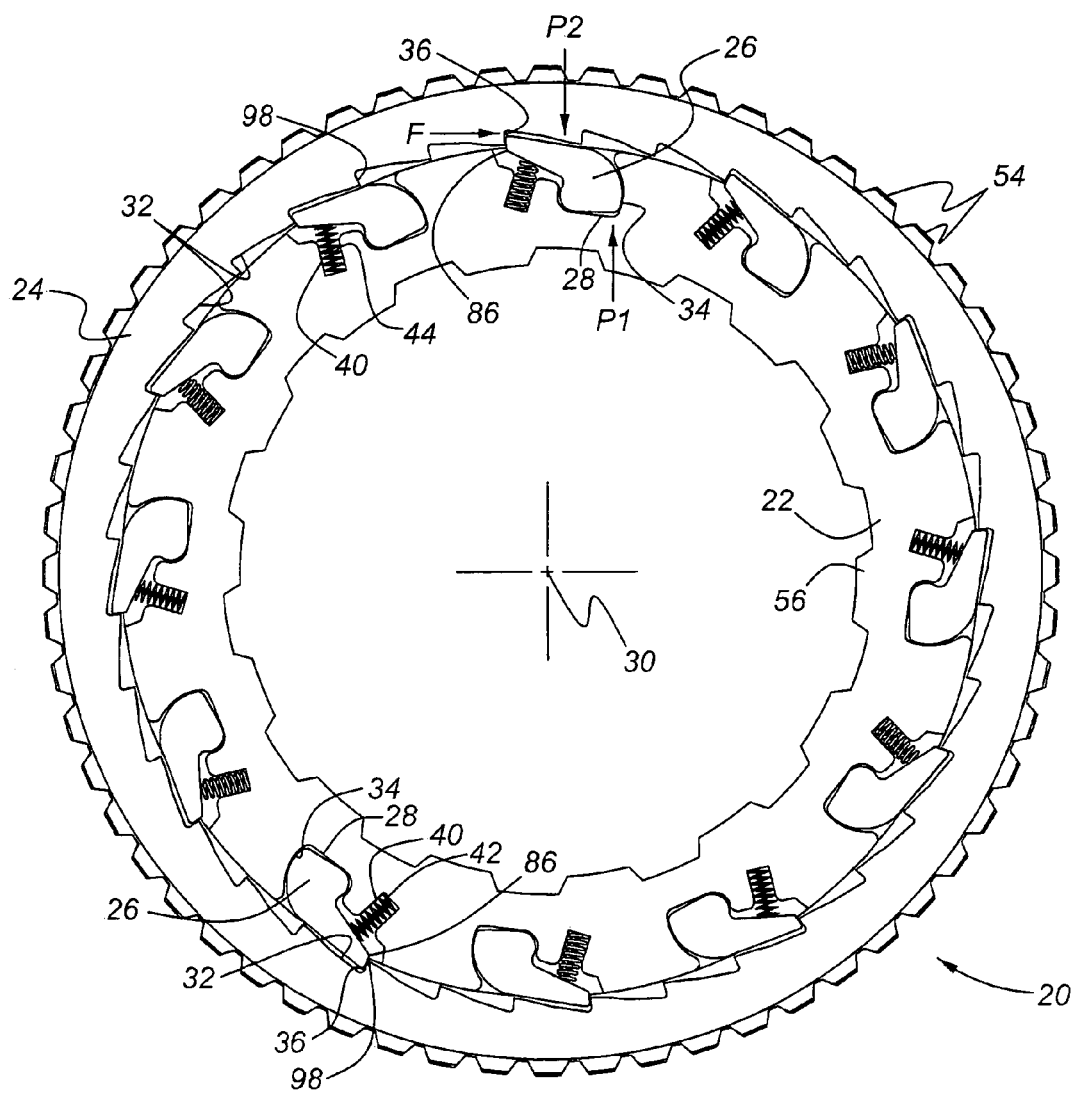
FIG. 1 is a side view of a clutch according to the present invention showing rockers located in an inner race and engaged with notches in an outer race.
Figure 2:
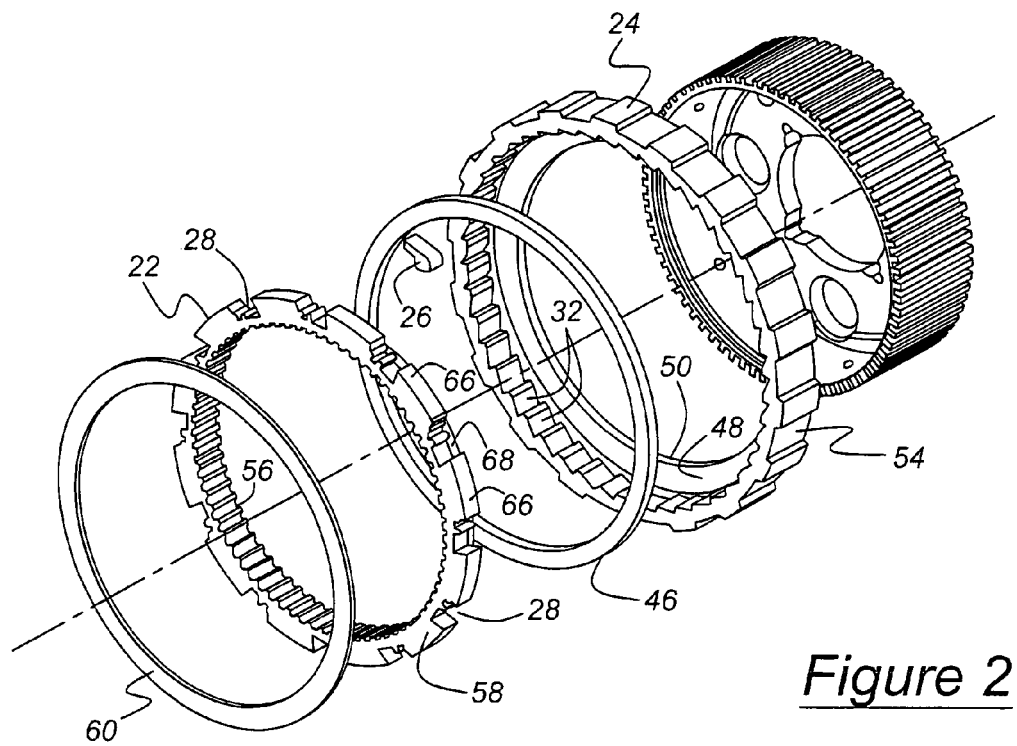
FIG. 2 is an isometric view of the clutch assembly showing the components mutually spaced axially.

Referring now to the drawings, there is illustrated in FIG. 1 a one-way clutch assembly 20 in accordance with the present invention. The clutch assembly 20 includes an inner race or rocker plate 22, an outer race or cam plate 24, and a plurality of rockers 26, each rocker being located in a pocket 28 formed in the inner race 22 and angularly spaced mutually about a central axis 30. The inner periphery of the outer race 24 is formed with a plurality of cams or notches 32 angularly spaced mutually about axis 30. There are twelve rockers 26 and pockets 28 and thirty-six notches 32 in the clutch illustrated in FIG. 1.

When the inner race 22 rotates clockwise faster than the outer race 24, each rocker 26 pivots counterclockwise in its pocket 28 away from engagement with the notches 32 due to contact of the rockers with the inner radial surface of the outer race. This allows the inner race 22 to rotate freely clockwise about axis 30 relative to the outer race 24. When the inner race 22 attempts to rotate counterclockwise relative to the outer race 24, the inner race and outer race are engaged or driveably connected mutually by engagement of the rockers 26 with the notches 32.

When the clutch 20 is engaged, each engaged rocker 26 transmits a force F between the inner and outer races 22, 24 due to its contact with the inner surface 34 of the pocket and with the radially directed surface 36 of the engaged notch 32.

A recesses 40, located at each pocket 28, contains a spring, such as a helical coiled compression spring 42 or an accordion compression spring 44, for urging each rocker to pivot in its pocket toward engagement with the notches.

FIGS. 2-5 show a clutch having a rocker plate 22 formed with angularly spaced pockets 28 and spring recesses 40, each pocket containing a rocker 26 that pivots in a respective pocket alternately to engage and to disengage the notches 32 formed on the radially inner surface of the cam plate 24. A bushing 46 of powdered metal fits within the cam plate 24.

Figure 5:
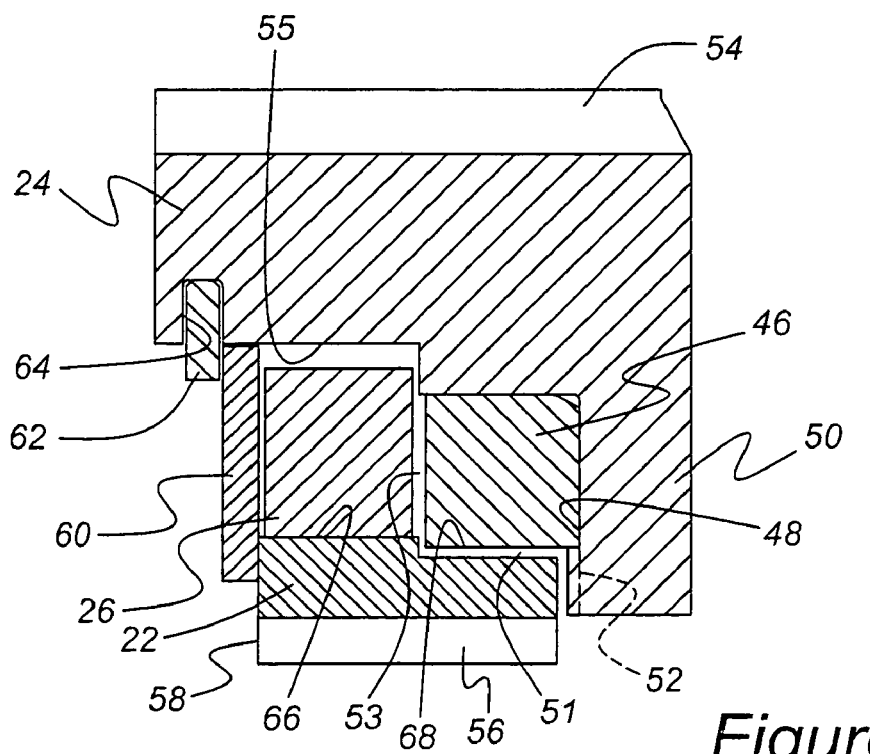
FIG. 5 is a side view, partial cross section through a diametrical plane showing the components assembled.

As seen best in FIG. 5, when clutch 20 is assembled, an axial surface of bushing 46 contacts an inner axial surface 48 of a flange 50. Surface 48 is formed with radially directed grooves 52, which carry fluid lubricant, preferably transmission oil, radially outward a radial inner surface of the bushing 46. Oil enters the radial grooves 52 through holes 49 formed through a drive system component 72, which is connected to the clutch 20. The oil travels axially leftward across the inner radial surface 51 on the bushing 46, to a radial space 53, which directs the oil radially outward to surface 55, across the width of the rocker plate 22 and across the surface of the rockers 26. Bushing 46 pilots the inner and outer races 22, 24 and eliminates need to machine along the notches or cams 32 of the outer race or the radial outer surface area 66 of the rocker plate 22. Lubricating oil is precisely directed radially along grooves 52 to the bushing 46, then axially between surfaces 68 on the rocker plate 22 and the inside diameter 51 of the bushing to the rockers 26. The lubricant flows along this path due to a centrifugal pressure head developed as the clutch rotates about axis 30.

The radial outer surface of the cam plate 24 is formed with splines 54, by which the cam plate is driveably connected to a drive system. Similarly, the radially inner surface of the rocker plate 24 is formed with splines 56, by which the rocker plate is driveably connect to a component of the drive system.

An axial surface 58 of rocker plate 22 contacts a retainer ring 60, which closes the axial end of each pocket 28 and is retained in position by a snap ring 62, which engages a recess 64 formed on the cam plate 24.

Figure 3:
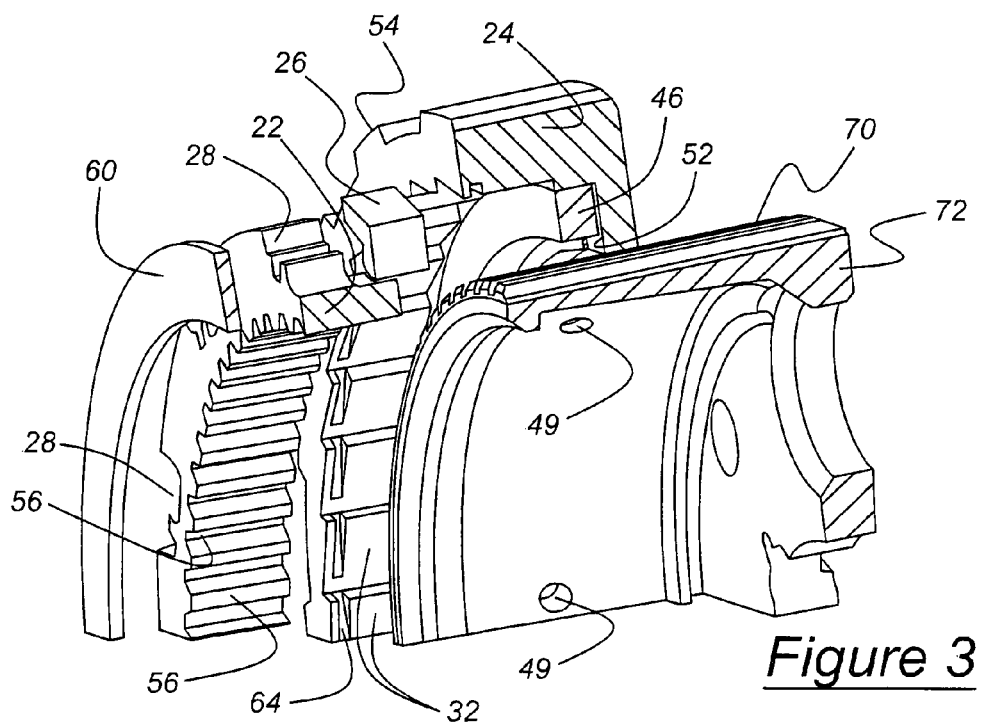
FIG. 3 is a isometric view of the clutch assembly of FIG. 2 partially in cross section taken at a diametric plane showing the components in spaced relationship.
Figure 4:
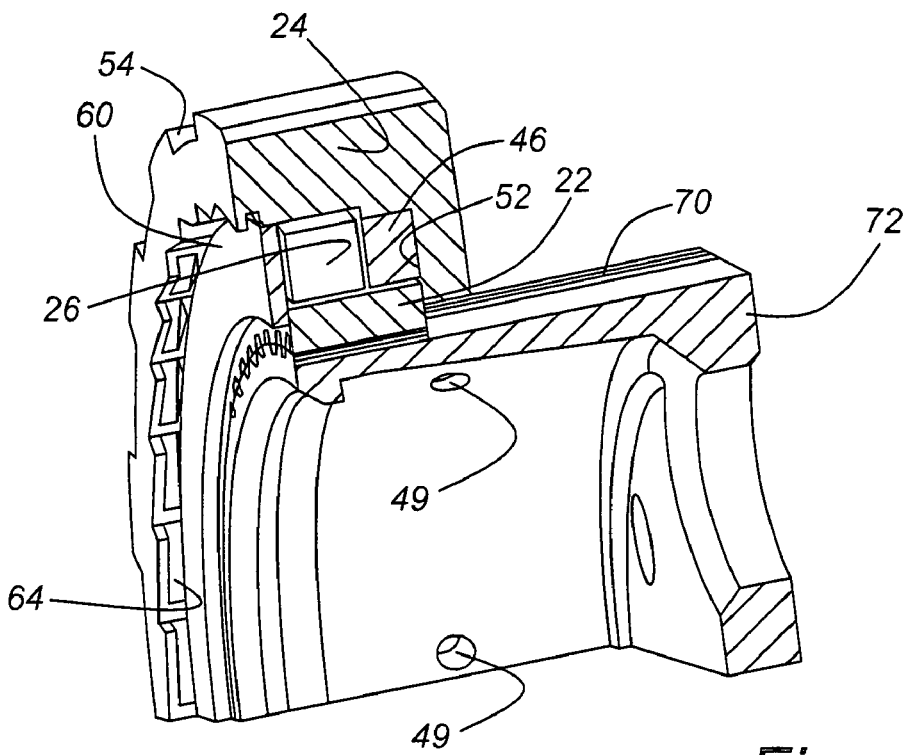
FIG. 4 is an isometric view of the clutch assembly of FIG. 2 partially in cross section through a diametrical plane showing the components assembled.

FIGS. 3 and 4 show the components of the clutch 20 located immediately adjacent their assembled positions and in the assembled positions, respectively. The clutch 20 is assembled with the cam plate 24 driveably connected by splines 70 to a drum 72 of a vehicle drive system.

Figure 6:
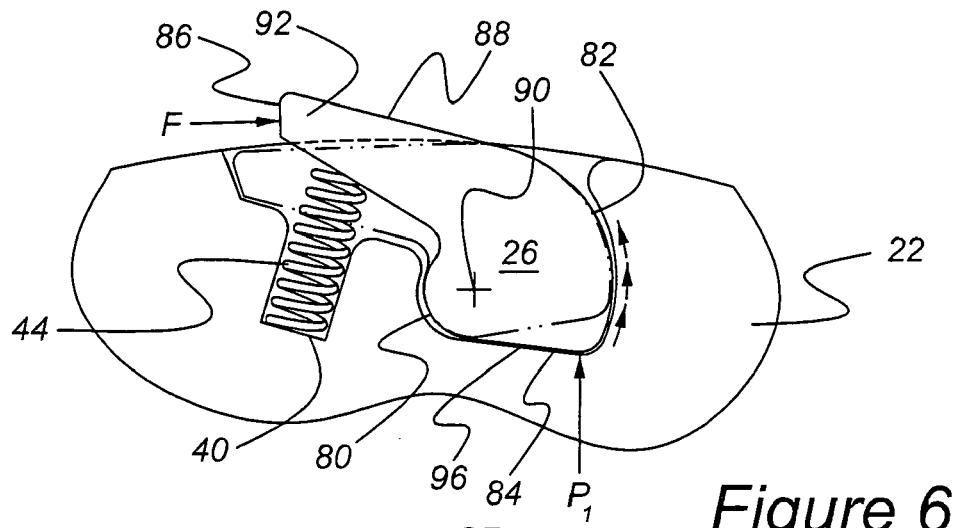
FIG. 6 is side view of a portion of an inner race showing a rocker, pocket, and return spring.

Referring now to FIG. 6, a preferred embodiment of a rocker 26 may include several surfaces 80, 82, 84, 86, 88, and a defined pivot center 90. Surfaces 80 and 82 are both circular cylindrical surfaces whose arcs are concentric with the pivot center 90. Surfaces 80, 82 guide rotation or pivoting of the rocker 26 and limit that pivoting to one degree of freedom. The arcs of both surfaces 80, 82 must be sufficient such that the neck or strut portion 92 of the rocker is narrower than the counterweight portion 94 in order to restrain the rocker in the radial direction from center 90.

Surface 80 is a guiding surface. When force F is applied while the clutch is driving and the rockers 26 are engaged with the notches 32, preferably no reaction force is developed on surface 80. Surface 82 is a surface on which the reaction to force F is developed when clutch 20 is transmitting torque between the outer race and inner race 22 through the rocker 26. Because the center of surface 82 is located at the pivot center 90, the reaction to force F is distributed along surface 82 is centered at pivot center 90, and produces no torque tending to pivot the rocker 26 about the pivot center.

Surface 84 limits clockwise pivoting of the rocker 26 and assists assembly of the race 22 or 24 that contains the pockets 28, rockers 26 and springs 42, 44. That race is prepared for installation by inserting a rocker 26 in each pocket and placing a spring 42, 44 in each recess 40. The force applied by the spring on its respective rocker rotates the rocker to the position shown in FIG. 6 where surface 84 contacts the base 96 of the pocket 28. The spring force and its reaction force on the base 96 retains the rocker in the pocket without the presence of the other race or another assembly aid. The race containing the rockers can be transported readily with the rockers in this retained condition preparatory to installing the race subassembly in the clutch assembly 20.

By limiting pivotal rotation of the rocker 26 about pivot center 90, a counter-rotation reaction force on the strut is generated at surface 84 when the clutch is driving or engaged. When clutch 20 is driving, force F, applied to rocker surface 86, produces a clockwise torque on the rocker about the pivot center 90. Torque about center 90 produced by force F is reacted by a force P1 where rocker surface 84 contacts pocket surface 96. Without surface 84, the full reaction torque would be reacted elsewhere. For example, if the full torsion reaction to force F were applied to rocker surface 88, a large hoop stress would be generated on the race contacted by surface 88 tending to shear the wall of that race due to a high angle of incidence of the reaction force. If the torsion reaction to force F were applied to surface 82, it would be applied at the extremity of the inner race at its weakest point. Preferably, the torsion reaction to force F is located normal to the pocket base 96 at rocker surface 84, and on surface 82 where friction is developed due to contact with the pocket.

Surface 86 is the surface on which force F is applied when the clutch 20 is driving and the rockers 26 are engaged with the radial surfaces 36 of the notches 32. Surface 86 performs this function by creating a mechanical interference when the rocker is pivoted to the engaged position.

Surface 88, located at the contour of the strut portion 92 of the rocker 26, contacts the crest 98 of the radial surfaces 36 of the notches 32 to ensure no interference when the clutch 20 is overrunning and the rockers 26 are disengaged from the notches 32. Surface 88 is curved to facilitate formation of a film of lubricant while the clutch is overrunning. Surface 88 is curved also to minimize impact with the crests 98 while the clutch overruns by providing transitional positions that minimize the rate of rotation of the rocker into the pocket relative to the rate of rotation of the outer race. This minimizes angular acceleration on the rocker as the clutch overruns.

The center of mass 100 of the rocker 26 can be located in relation to the pivot center 90 such that centrifugal force tends either to engage or to disengage the rocker, whether the rocker is located on the outer race or the inner race.

Figure 7:
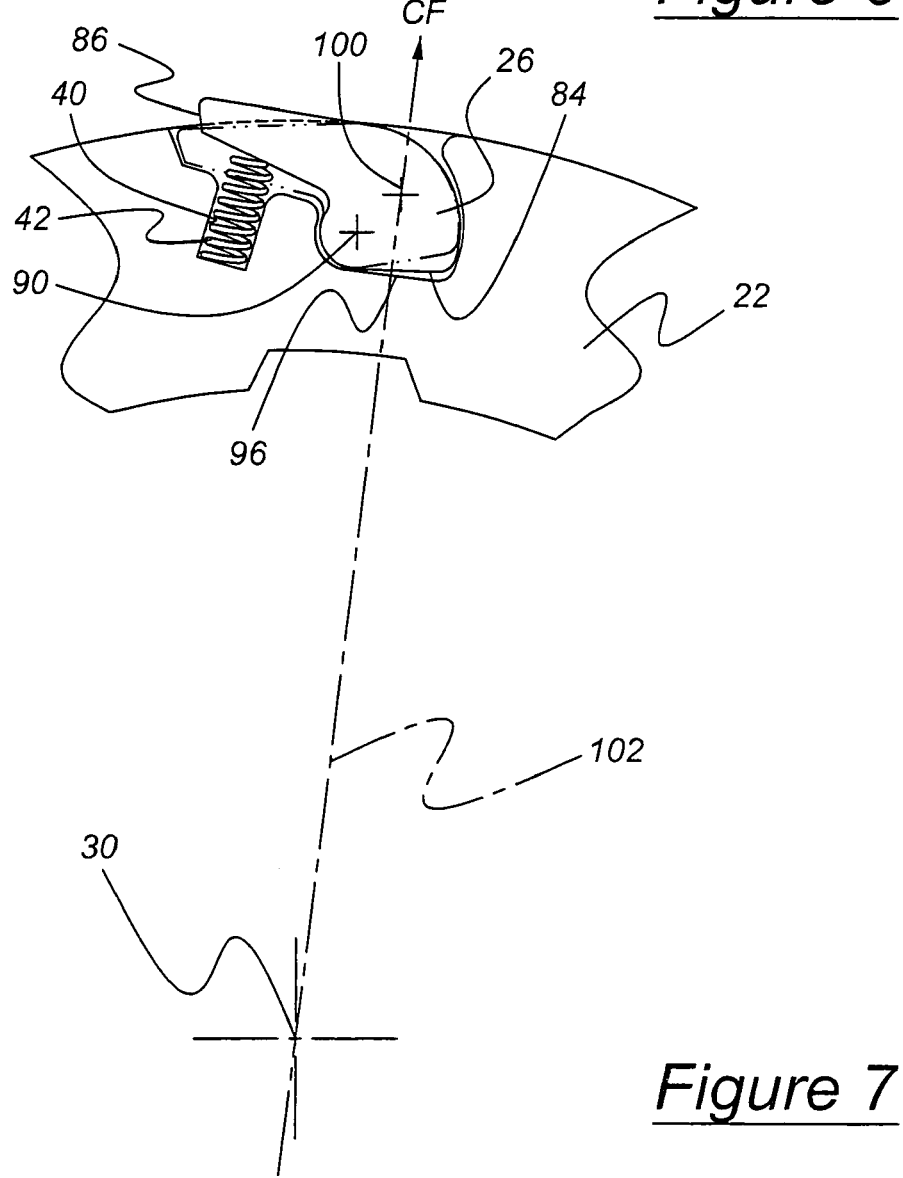
FIG. 7 is side view of a portion of an inner race showing a rocker, pocket, return spring, and a CF vector.

When viewed as in FIG. 7, the center of mass 100 is located rightward from a line connecting the axis 30 and the pivot center 90, and the rocker is carried in a pocket located on an inner race 22. As the clutch assembly 20 rotates about axis 30, centrifugal force on the rocker is directed radially outward along a line 102 that passes through axis 30 and the center of mass 100, causing the rocker 26 to pivot counterclockwise about the pivot center 90. This counterclockwise pivoting of the rocker opposes the force of the spring 42, 44 and tends to pivot rocker surface 86 away from contact with pocket surface 36 on the inner race 24. This counterclockwise pivoting of the rocker tends to move the rocker to a disengaged position, and allows the inner race 22 to overrun and the clutch 20 to disengage. The magnitude of the moment about pivot center 100 tending to compress spring 42 and to pivot the rocker 26 to the disengaged position varies with the speed of rotation of the inner race and the distance of the center of mass 100 from the pivot center 90.

Alternatively the center of mass may be located leftward from a line connecting the axis 30 and the pivot center 90, when the rocker is carried in a pocket located on an inner race 22. In that case, as the clutch assembly 20 rotates about axis 30, centrifugal force on the rocker causes the rocker 26 to pivot clockwise about the pivot center 90. This clockwise pivoting of the rocker adds to the effect of the force of spring 42, tends to move surface 86 of the rocker toward contact with radial surface 36 on the outer race 24, i.e., to pivot the rocker 26 to an engaged position, and causes the clutch to engage.

Figure 8:
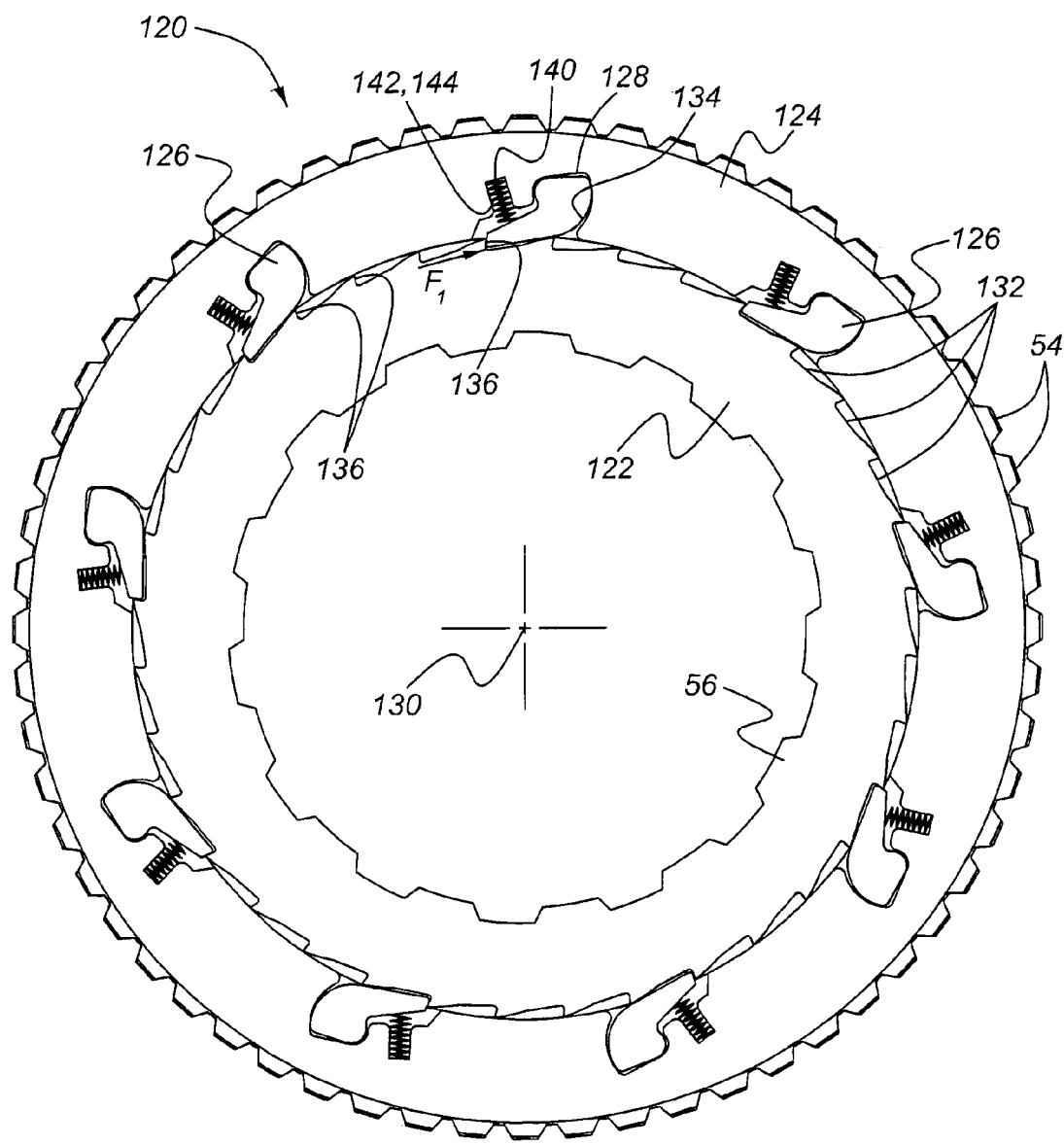
FIG. 8 is a side view of a clutch showing rockers located in an outer race and engaged with notches in an inner race.

FIG. 8 illustrates an embodiment of a clutch assembly 120, in accordance with the present invention. The clutch assembly 120 includes an outer race or rocker plate 122, an inner race or cam plate 124, and a plurality of rockers 126, each rocker being located in a pocket 128 formed in the outer race 124 and angularly spaced mutually about a central axis 130. The outer periphery of the inner race 122 is formed with a plurality of cams or notches 132, angularly spaced mutually about axis 30. There are nine rockers 126 and pockets 128 and thirty-six notches 132 in the clutch illustrated in FIG. 1.

When the outer race 124 rotates clockwise faster than the inner race 122, each rocker 126 pivots clockwise in its pocket 128 away from engagement with the notches 132 due to contact of the rockers with the outer radial surface of the inner race. This allows the outer race 124 freely to rotate clockwise about axis 130 relative to the inner race 122. When the outer race 124 attempts to rotate counterclockwise relative to the inner race 122, the inner race and outer race are engaged or driveably connected mutually by engagement of the rockers 126 with the notches 132.

When the clutch 120 is engaged, one or more engaged rockers 126 transmit a force between the inner race 122 and outer race 124 due to the rocker's contact with the inner surface 134 of the pocket 126 and with the radially directed surface 136 of the engaged notch 132.

A recesses 140, located at each pocket 28, contains a spring, such as a helical coiled compression spring 142 or an accordion compression spring 144, for urging each rocker to pivot in its pocket toward engagement with the notches.

Figure 9:
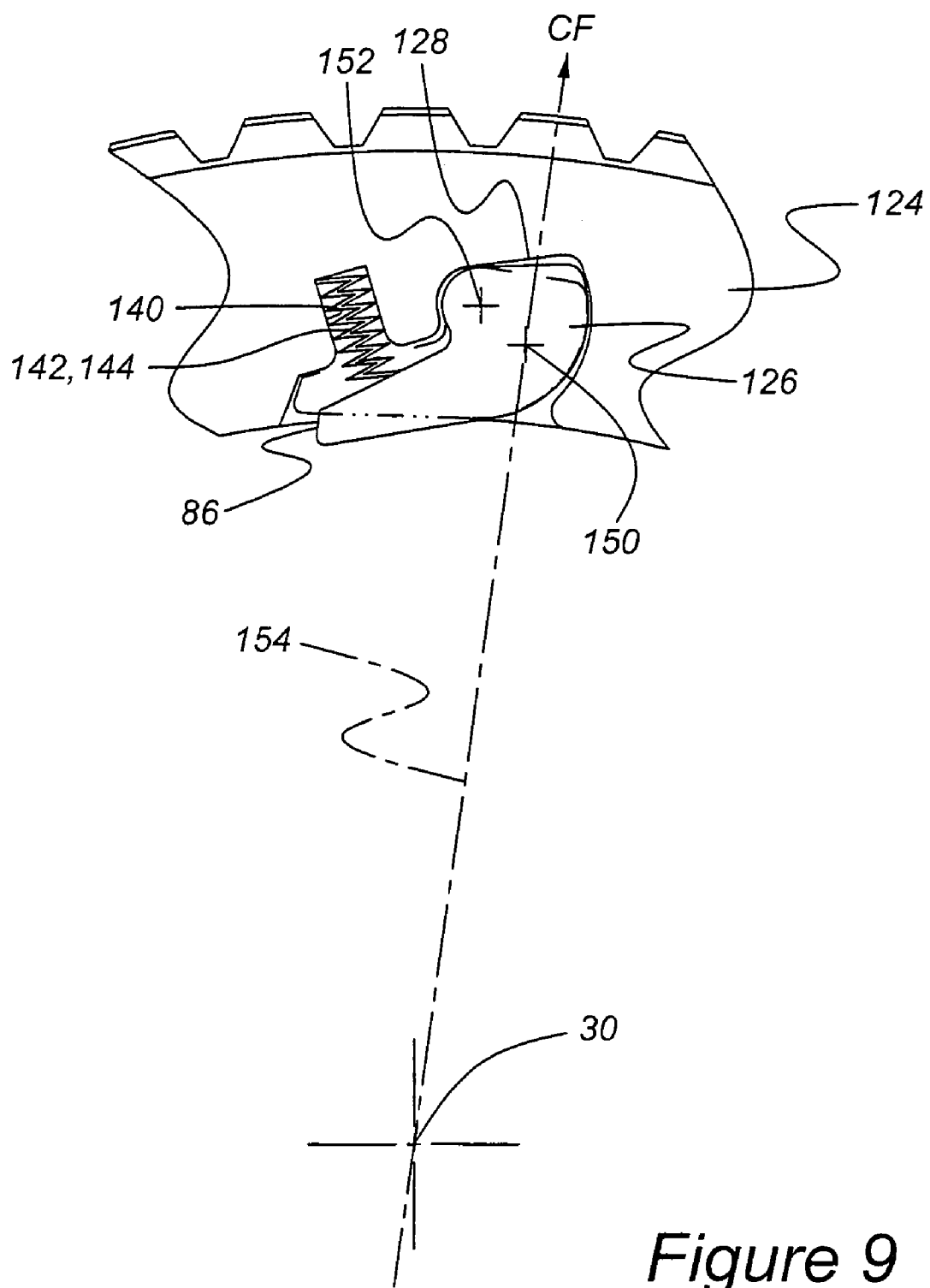
FIG. 9 is side view of a portion of an outer race showing a rocker, pocket, return spring, and a CF vector.
Figure 10:
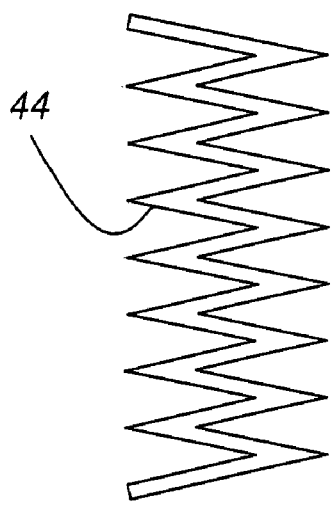
FIG. 10 is side view of an accordion return spring.
Figure 11:
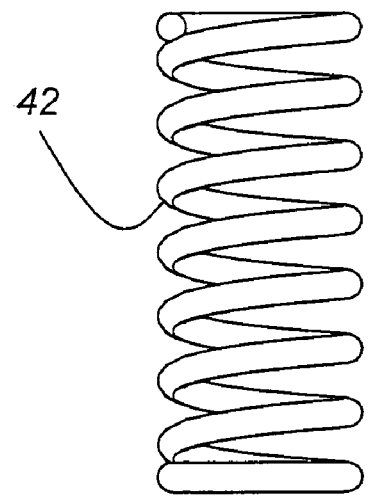
FIG. 11 is side view of a helical return spring.

When the clutch assembly 120 is viewed as in FIG. 9, the center of mass 150 of each rocker 126 is located rightward from a line connecting the axis 130 and the pivot center 152. As the outer race 124 rotates about axis 130, centrifugal force on the rocker is directed radially outward along a line 154 that passes through axis 130 and the center of mass 150, causing the rocker 126 to pivot counterclockwise about the pivot center 152. This counterclockwise pivoting of the rocker cooperates with the force of the spring 42, 44, tends to pivot the rocker to an engaged position with surface 136, and engages the clutch.

Alternatively, in the clutch assembly 120, the center of mass 150 of each rocker 126 may be located leftward from a line connecting the axis 130 and the pivot center 152. In that case, as the outer race 124 rotates about axis 30, centrifugal force on the rocker causes the rocker 126 to pivot clockwise about the pivot center 152. This clockwise pivoting of the rockers opposes the effect of the spring force and tends to pivot rotate surface 86 of the rocker away from contact with radial surface 136 on the inner race 122. This action tends to move the rocker to a disengaged position, and allows the clutch to overrun and to disengage.

Figure 12:
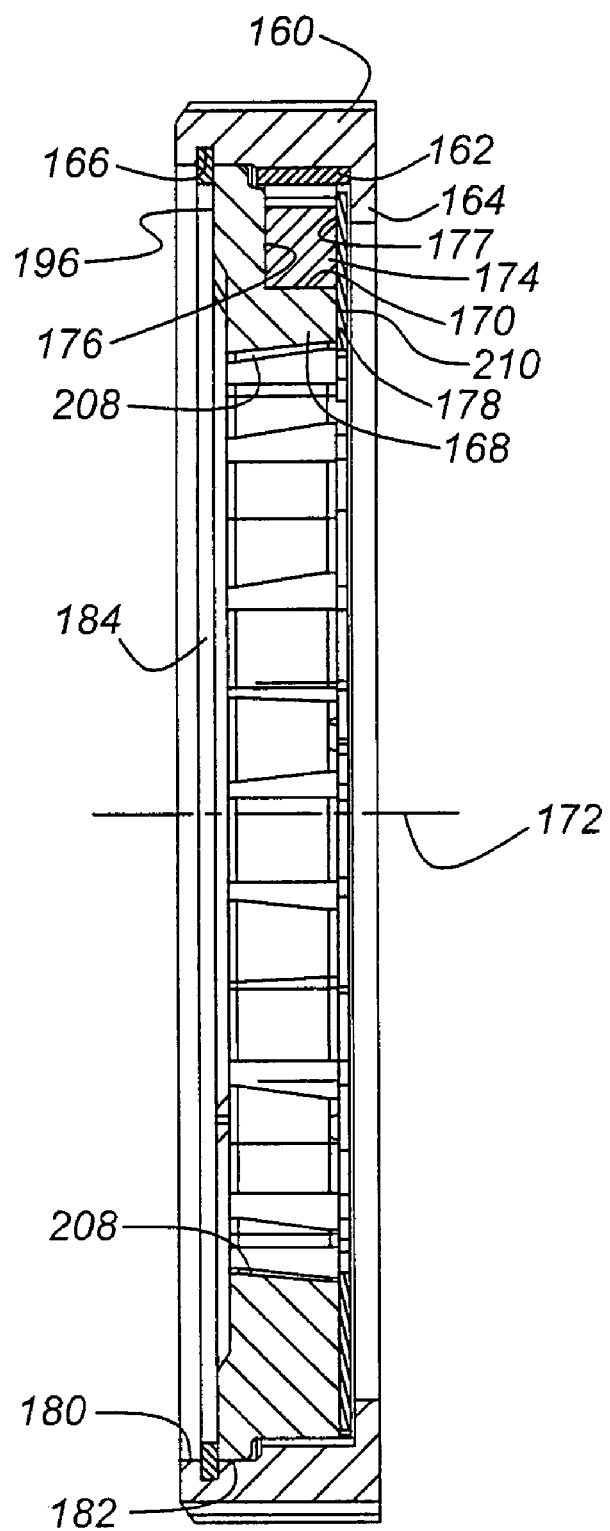
FIG. 12 is a cross section taken at a diametric plane through a one-way clutch assembly according to this invention.

Referring now to FIG. 12, an alternate clutch assembly, similar to that of FIG. 1, includes a cam plate 160 formed with notches 162, a radial flange located at an axial end of the cam plate, and a recess 166 located at the opposite axial end of the cam plate.

A rocker plate 168 is formed with multiple pockets 170, angularly spaced at equal intervals about a central longitudinal axis 172, each pocket containing a rocker 174. Each pocket 170 is blind, closed at one axial end by a surface 176 and open at the opposite axial end 177. Similarly to those of FIG. 1, each pocket 170 has an opening at its radial outer periphery, through which opening the respective rocker passes as it moves to engage and disengage the notches, which face the pockets. The axial end 177 of pocket 170 is covered by a retainer plate 178 which covers the pocket and spring recesses 40.

The cam plate 160 is formed with an internal, axially directed cylindrical surface 180, and the rocker plate 168 is formed with an external, axially directed cylindrical surface 182, on which the cam plate is piloted for axial movement to the assembled position shown in FIG. 12. Upon installation, surfaces 180, 182 are mutually engaged and provide bearing support for relative rotation of the cam plate and rocker plate. A retainer ring 184 seats in the recess 166 to secure the rocker plate 168 against axial movement relative to the cam plate 160 after their assembly and during operation.

Figure 13:
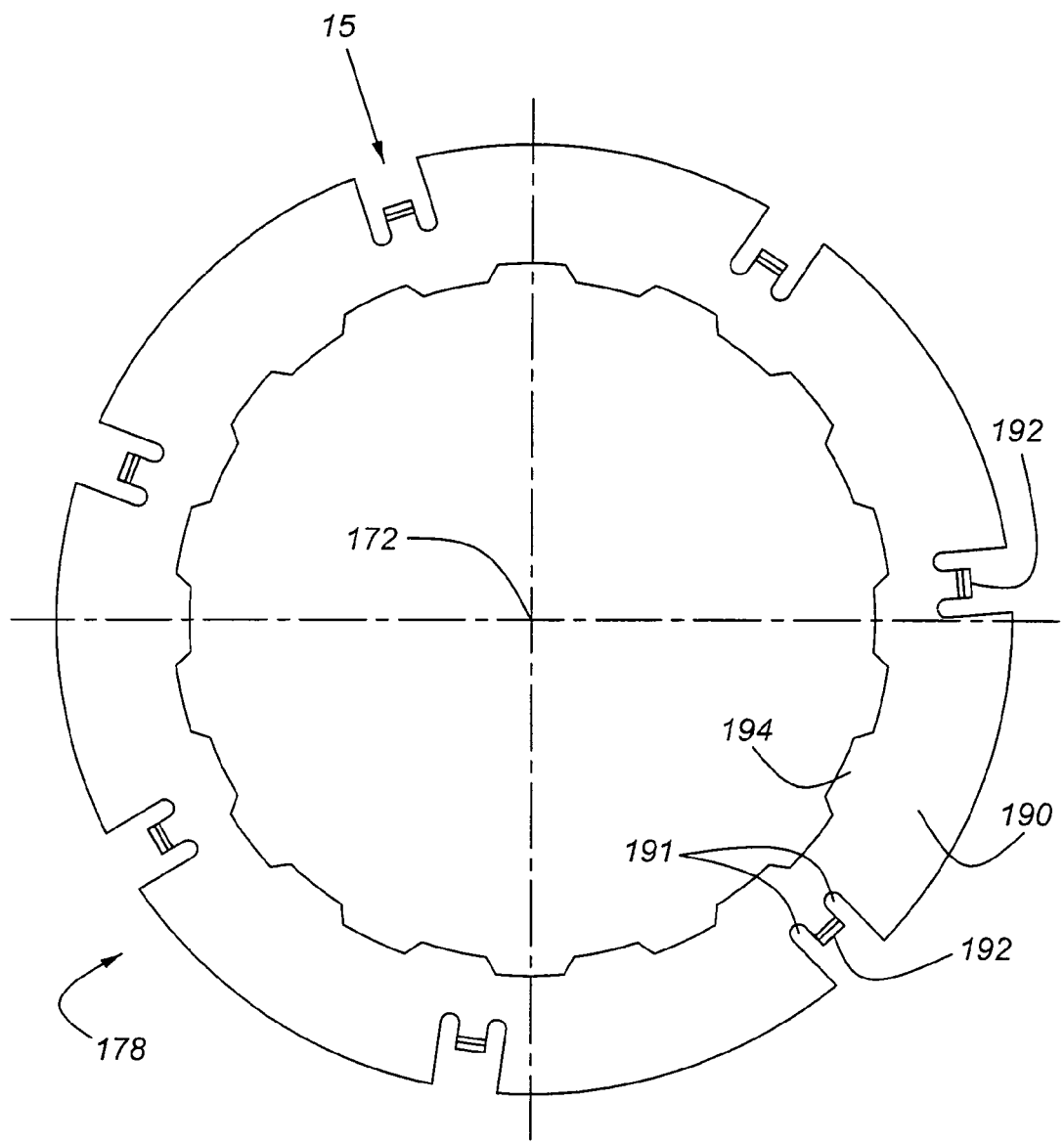
FIG. 13 is a front view of a retainer plate.
Figure 15:
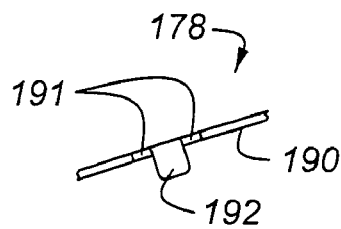
FIG. 15 is a local view of the retainer plate taken in the direction of arrow 15.
Figure 14:
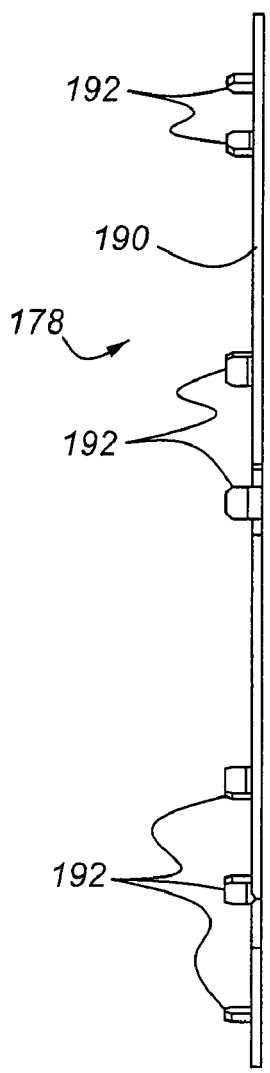
FIG. 14 is a is a side view of the retainer plate of FIG. 13.

Turning now to FIGS. 13-15, the retainer plate 178 is a substantially planar circular ring 190, whose axial inner surface is located adjacent the open axial end 177 of the pockets 170. Angularly spaced tabs 192 extend axially from the surface of ring 190 toward the rocker plate 168, to which the retainer plate 178 is secured for rotation with the rocker plate. An inner periphery 194 of the retainer plate is formed with a contour similar to a spline having alternating crests and valleys angularly spaced about axis 172. FIG. 15 shows a typical axially directed tab 192 that extends from the plane of surface 190 of the retainer plate 178 and the adjacent relief recesses 191, which facilitate bending the tabs into position.

Figure 16:
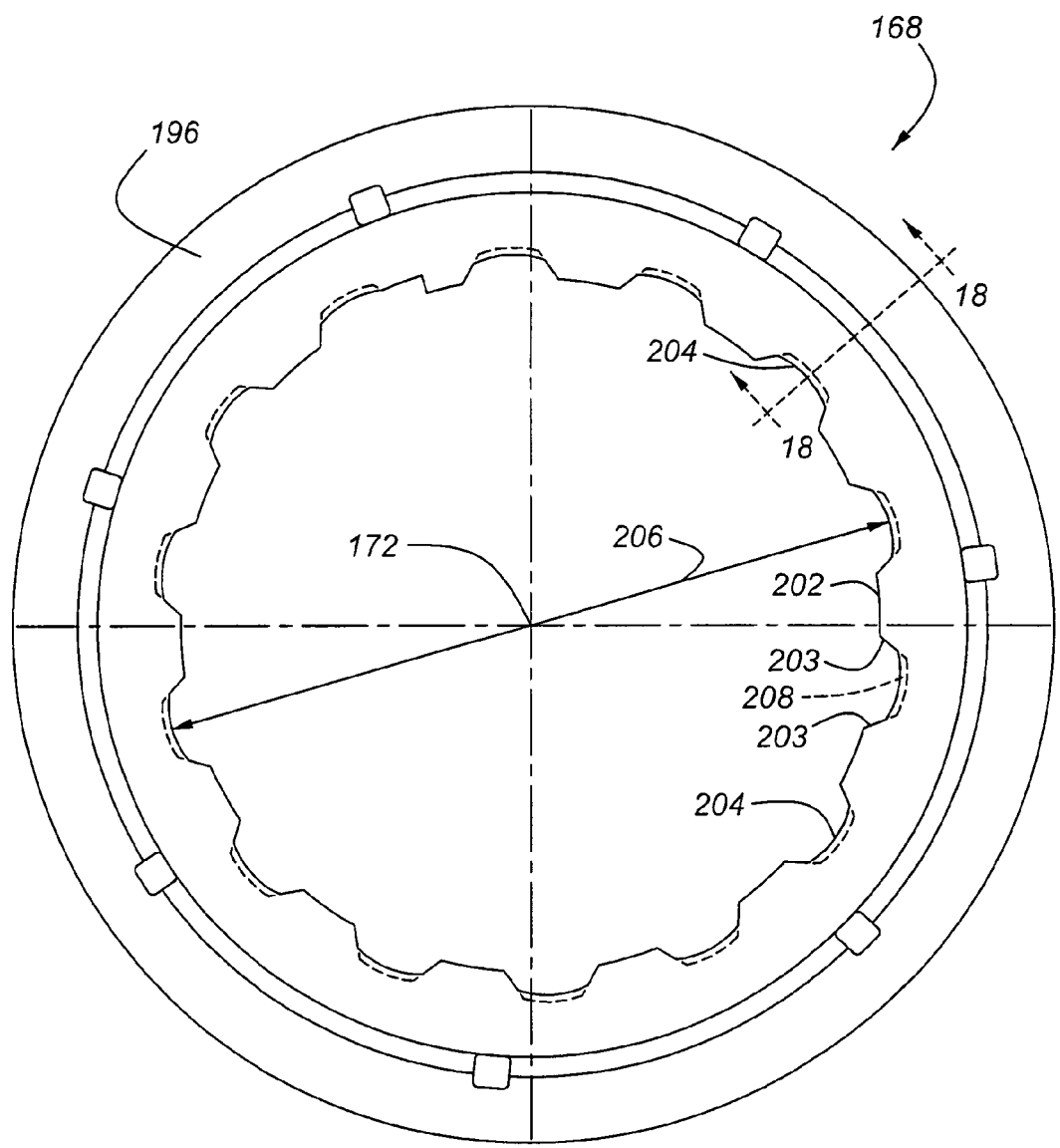
FIG. 16 is a end view of a the rocker plate of FIG. 12 looking toward the axial end that is opposite the open axial end of the pockets.

Referring to FIG. 16, the face 196 of the rocker plate 168 that is axially opposite the open axial end 177 of the pockets 170 is formed at its radial inner surface with a interior spline, which extends axially across the rocker plate. The spline contour includes alternating crests 202 and valleys 204 angularly spaced about axis 172 and connected by tooth faces 203. The interior spline, which has a major diameter 206, is driveably engaged by an external spline on a component connected by the splines. The spline valleys 204 each have an arcuate base that creates a space for a fluid passage 208 between the major diameter 206 and the base of the valley 204.

Figure 18:
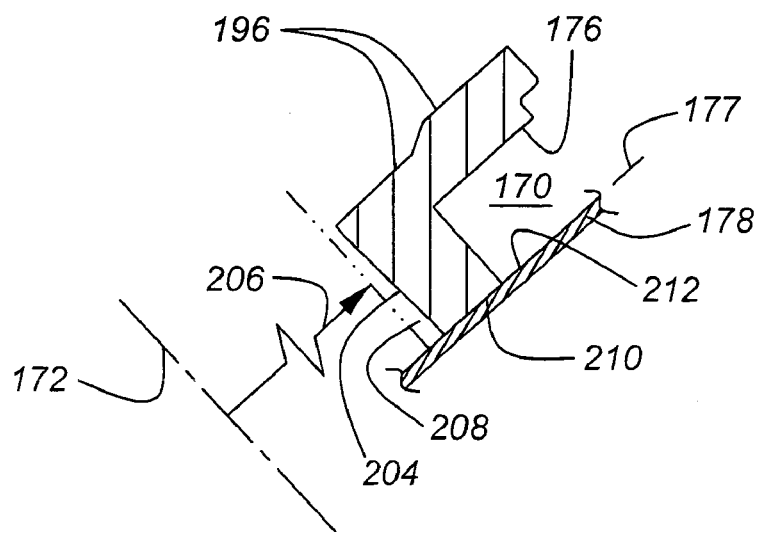
FIG. 18 is a cross section taken at plane 18-18 of FIG. 17.

FIG. 18 shows that the passages 208 are directed axially across the rocker plate from surface 196 toward the open axial end 177 of each pocket 170 and radially outward from axis 172. Fluid lubricant, carried in the fluid passages to the retainer plate 178, flows between the rocker plate surface 210 and the axially inner surface 212 of the retainer plate 178 into the pocket 170 and radially outward against the notches 162 of the cam plate 160. In this way, the rocker, pocket and notches are continually lubricated.

Figure 19:
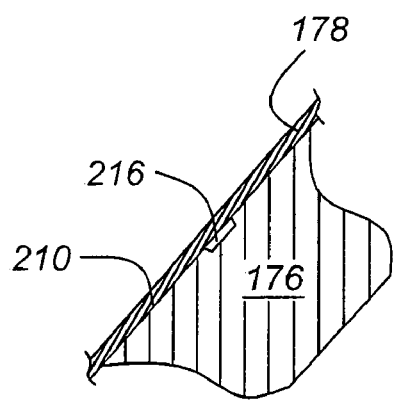
FIG. 19 is a cross section taken at plane 19-19 of FIG. 17.
Figure 17:
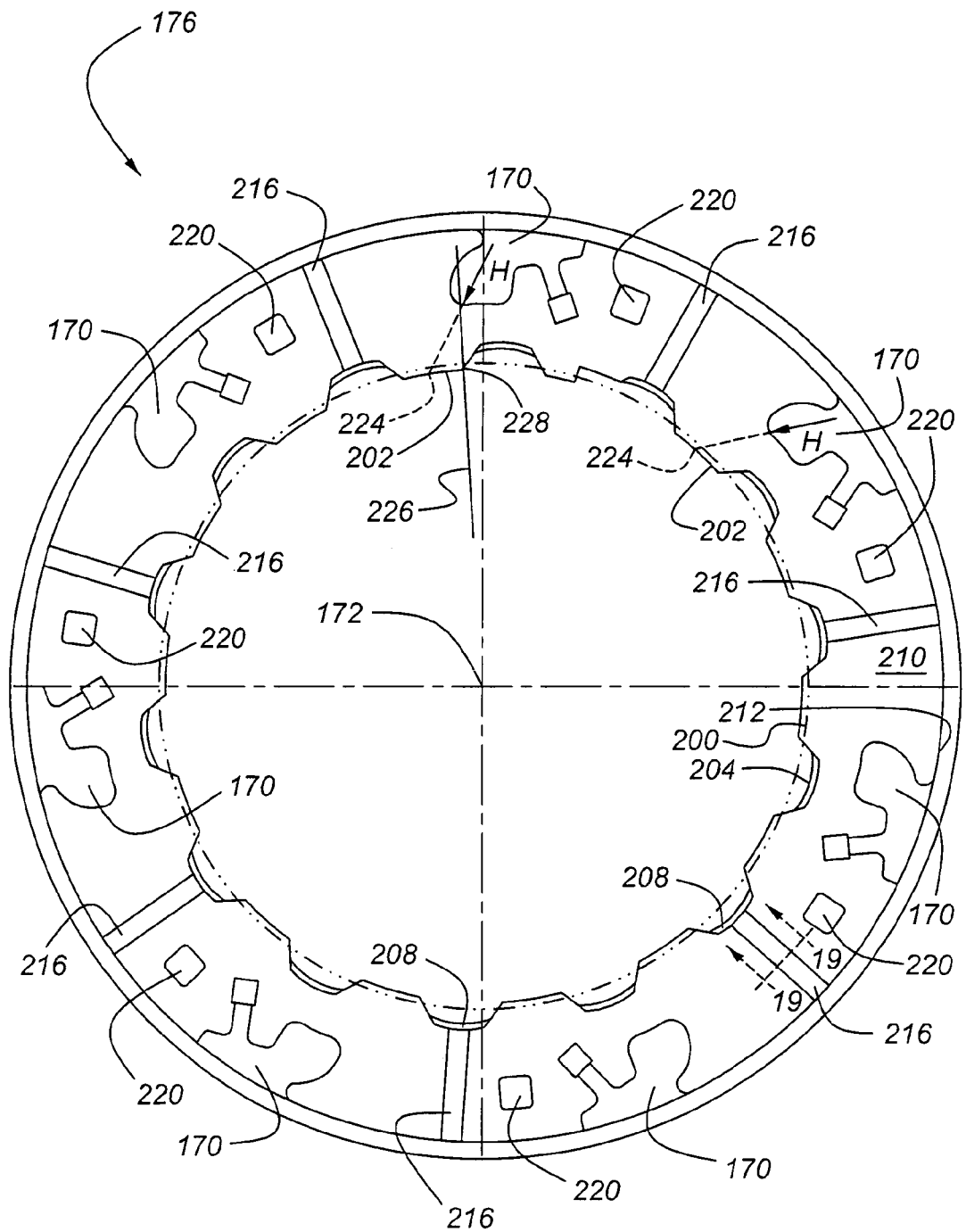
FIG. 17 is a end view of a the rocker plate of FIG. 12 looking toward the open axial end of the pockets.

Referring now to FIGS. 17 and 19, surface 214 of rocker plate 168, which is axially opposite surface 196, is formed with angularly spaced radial channels 216, each channel being located between successive, adjacent pockets 170. Each channel 216 extends from the spline valleys 204, radially across surface 210 and is covered by the retainer plate 178. Fluid lubricant exiting channels 216 is thrown radially outward against the surfaces of the notches 162 on the cam plate 160

The axial surface 210 is also formed with angularly spaced tab recesses 220, which are located and sized to receive the tabs 192 of the retainer plate 178. When the tabs 192 are engaged with the recesses 220, retainer plate 178 is located adjacent the axial surface 210 of the rocker plate 168, and the retainer plate is secured to the rocker plate so that they rotate as a unit.

When the clutch engages, at least one rocker in a pocket 170 of the rocker plate 168 becomes engaged with a notch 162 on the cam plate 160, and a force F is applied to the rocker, as shown in FIG. 1. The external forces applied to the engaged rocker are transmitted to a corner 222 of the respective pocket 170, where the resultant of applied forces H is reacted on rocker plate 168.

According to another aspect of this invention, the internal splines at the inner radial periphery of rocker plate 168 are angularly positioned about axis 172 and indexed relative to the corner 222 of each pocket 170 such that a spline crest 202 is located at an extension of the line of action of the force represented by vector H. The line of action of force H extends from the mid-point on surface 86 of a rocker 26 that is engaged with a cam 36 to the opposite corner of the pocket where the engagement force applied by the cam is reacted on the pocket wall. As FIG. 17 shows, the preferred location of the spline crest 202 is such that the line of action of force H passes through the crest at point 224, substantial midway between the angular extremities of the crest. This location of the crest relative to the pocket provides additional structural strength and stiffness to carry the engagement loads.

To ensure that the spline crest is so positioned and indexed to provide the desired structural advantage produced by its correct location, the spline crest 202 is located radially below and angularly offset from the nearest pocket 170 and its corner 222, and the spline valley 204 that is nearest each pocket is radially below and angularly aligned with the pocket.

Figure 20:
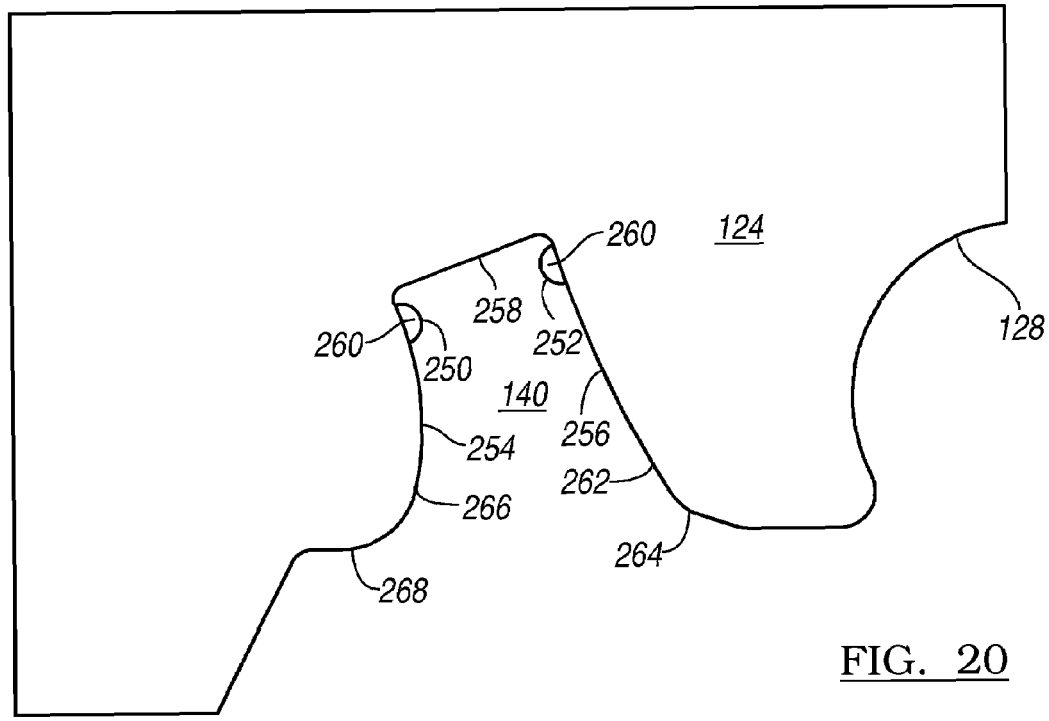
FIG. 20 is top view of a spring recess showing spring retainers located in the recess.
Figure 21:
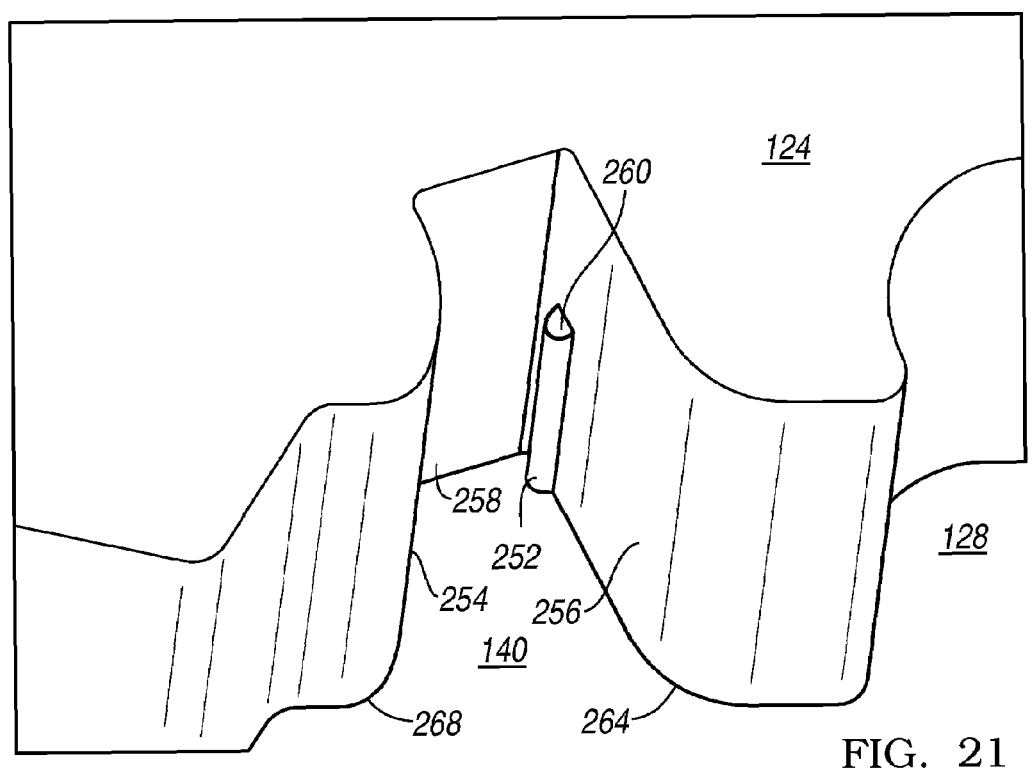
FIG. 21 is a perspective view of a spring recess formed with spring recesses.

Referring to FIGS. 20 and 21, each spring recess 140, is formed with two spring retainers 250, 252, preferably formed integrally on respective inner surfaces 254, 256 of the lateral walls of the recess 140. Each retainer 250, 252 is a semi-circular post or protrusion, which is spaced from the bottom surface 258 of the recess 140 and extends partially along the depth of the recess. The upper surface 260 of each retainer is inclined with respect to the depth of the recess 140. Surface 256 of the recess wall is flared outward 262 and terminates with a full radius 264. Similarly, surface 254 is flared outward 266 and terminates with a full radius 268, thereby providing a wider opening at the top of the recess 140 than the width of surface 258 at the bottom of the recess.

Figure 22:
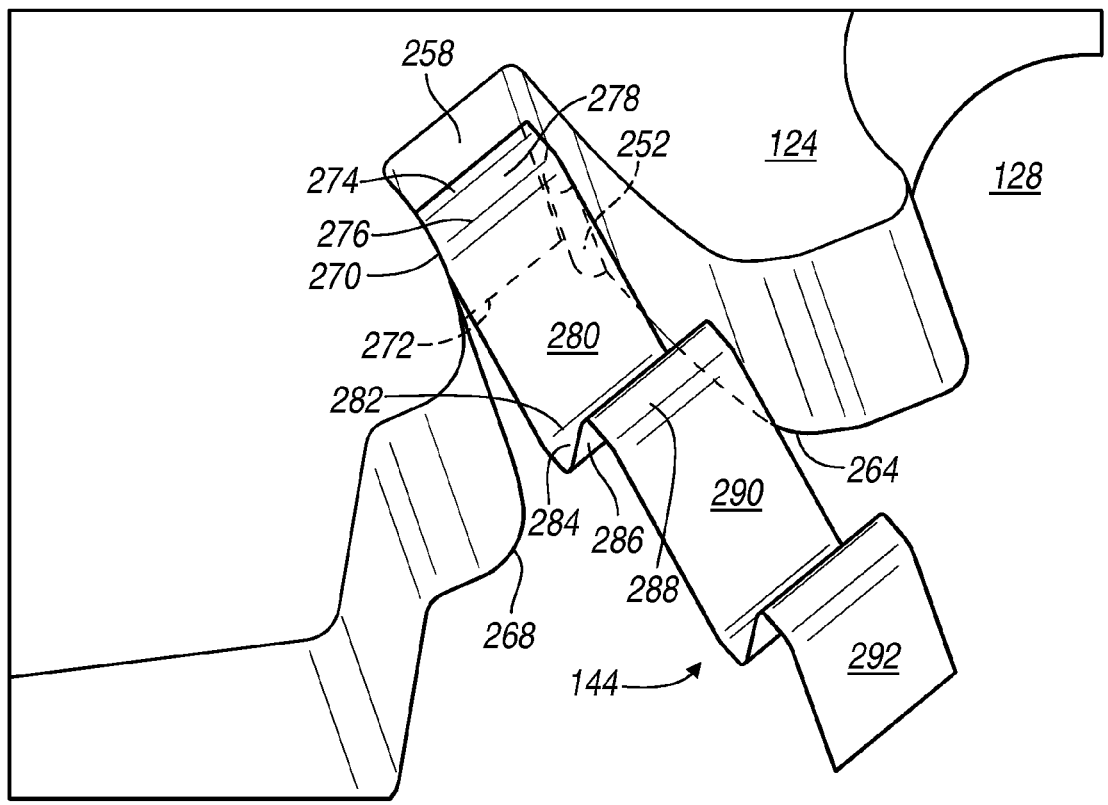
FIG. 22 is a perspective view of a spring recess showing a spring located in the recess and secure by spring retainers.

FIG. 22, illustrates an accordion spring 144 installed in a spring recess 140. The spring 144 is in the form of a strip of spring steel folded to form undulating legs that extend outward from the bottom 258 of the recess 140. The innermost spring leg 270 is located in the space between the retainers 250, 252 and surface 258, preferably contacting surface 258 and extending along the length of the retainers 250, 252. The lower edge 272 of leg 270 contacts the base of the recess 140. Creases 274, 276 are formed in the spring 144 at opposite ends of a short planar surface 278. Crease 276 forms an end of an inclined leg 280, which terminates at a crease 282, which is followed by a short planar surface 284, an inclined leg 286, short planar surface 288, another inclined leg 290, etc. Spring 144 terminates at an inclined leg 292, which contacts and urges the rocker 126 to pivot toward the cam surfaces 132.

The spring 144 is easily installed in ring 124 after removing plate 178, thereby gaining axial accessing to the spring recess 140. The innermost leg 270 of spring 144 is placed between surface 258 and the retainers 250, 252, the spring is then folded into the spring recess, the rocker 126 is placed in its pocket 128, and the spring is released such that it expands radially outward into contact with the rocker.

The centrifugal force of the spring produced by rotation of the ring 124 urges spring 144 radially toward the open end of the recess and away from surface 258. Because the inner leg 270 of spring 144 is looped over the retainers 250, 252 and is located in the narrow space between surface 258 and the retainer, the spring is retained in its correct position in the spring recess 140.

FIG. 20-22 depict the retainers 250, 252 and spring 144 installed in a one-way clutch or brake assembly 120, whose outer ring is a rocker ring 124 and whose inner ring 122 is formed with cam or notches 132 engagable by the rockers 126, as shown in FIG. 8. The spring retainers and 250, 252 and spring 144 can also be installed in a one-way clutch or brake assembly 20, whose inner ring 22 is a rocker ring and whose outer ring 24 is formed with cam or notches 32 engagable by the rockers 26, as shown in FIG. 1.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A device for transmitting torque in one rotary direction, comprising:
   a cam plate including notches spaced angularly about an axis;
   a rocker plate including pockets and spring recesses, each spring recess including a bottom facing the axis, an open end opposite the bottom, first and second walls extending toward the axis from the bottom to the open end, and retainers formed on the walls, each retainer separated by a space from the bottom;
   rockers, each rocker located in one of the pockets; and
   springs, each spring located in one of the spring recesses and comprising a strip of folded legs directed toward the axis, including an inner leg located in the spaces, and an outer leg contacting one of the rockers and urging the rocker radially toward engagement with the notches, the strip being looped over an axial outer end of each retainer, the retainers being located between successive folded legs of the strip.

2. The device of claim 1, wherein the spring recesses are mutually spaced angularly about the axis, and
   the retainers comprise a first retainer formed on the first wall, and a second retainer formed on the second wall, the first and second retainers blocking radial movement of the spring from the spring recess.

3. The device of claim 1, wherein
   the retainers comprise first and second retainers, the first retainer formed as a semicircular post secured to the first wall; and
   the second retainer formed as a semicircular post secured to the second wall.

4. The device of claim 1, further comprising:
   a retainer plate secured to the rocker plate for rotation therewith and covering an open end of the pockets and an open end of the spring recesses.

5. The device of claim 1, further comprising:
   tab recesses angularly spaced about the axis and formed in an axial surface of the rocker plate; and
   a retainer plate located adjacent said axial surface of the rocker plate, the retainer plate including tabs angularly spaced about the axis, each tab extending into a tab recess for securing the retainer plate to the rocker plate and covering an open axial end of the pockets and the spring recesses.

6. The device of claim 1, wherein:
   the rocker plate is located radially exterior of and surrounding the cam plate.

7. A rocker plate comprising:
   pockets mutually spaced angularly about an axis;
   rockers, each rocker being located in a respective pocket;
   spring recesses, each recess including a bottom facing the axis, an open end opposite the bottom, first and second walls extending toward the axis from the bottom to the open end, and retainers, each retainer formed on the walls and separated by a space from the bottom; and
   springs, each spring located in one of the spring recesses and comprising a strip of folded legs directed toward the axis and including an inner leg located in the space and an outer leg contacting one of the rockers and urging the rocker radially toward engagement with the notches, the strip looped over an axial outer end of the retainer such that the retainers are located between successive folded legs of the strip.

8. The rocker plate of claim 7, wherein the spring recesses are mutually spaced angularly about the axis, and
   the retainers comprise a first retainer formed on the first wall, and a second retainer formed on the second wall, the first and second retainers blocking the inner leg of the spring against radial movement from the spring recess.

9. The rocker plate of claim 7, wherein:
   the retainers comprise first and second retainers, the first retainer formed as a semicircular post secured to the first wall;
   the second retainer formed as a semicircular post secured to the second wall.

10. The rocker plate of claim 7, further comprising:
    a retainer plate secured to the rocker plate for rotation therewith and covering an open end of the pockets and an open end of the spring recesses.

11. The rocker plate of claim 7, further comprising:
    tab recesses angularly spaced about the axis and formed in an axial surface of the rocker plate; and
    a retainer plate located adjacent said axial surface of the rocker plate, the retainer plate including tabs angularly spaced about the axis, each tab extending into a tab recess for securing the retainer plate to the rocker plate and covering an open axial end of the pockets and the spring recesses.

12. The rocker plate of claim 7, further comprising:
    the rocker plate is located radially exterior of and surrounding a cam plate.

* * * * *